UNITED STATES PATENT OFFICE.

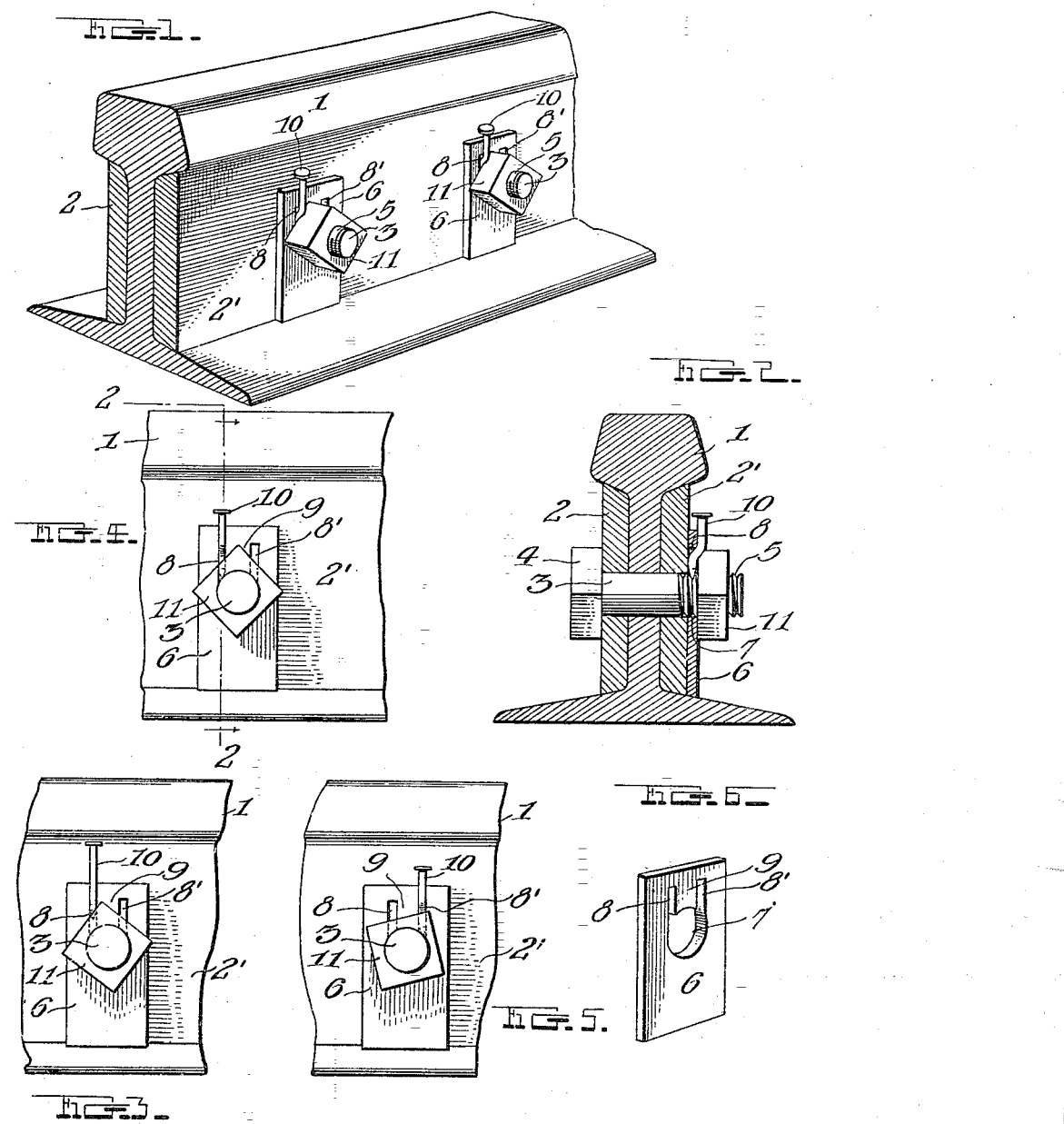

PHILIP A. LOGAN, OF ST. JOHN, NEW BRUNSWICK, CANADA.

NUT-LOCK.

1,127,654.        Specification of Letters Patent.        Patented Feb. 9, 1915.

Application filed August 20, 1914. Serial No. 857,707.

*To all whom it may concern:*

Be it known that I, PHILIP A. LOGAN, a subject of the King of England, residing at St. John, in the Province of New Brunswick and Dominion of Canada, have invented certain new and useful Improvements in Nut-Locks; and I do declare the following to be a full, clear, and exact description of the invention, such as will enable others skilled in the art to which it appertains to make and use the same.

My invention relates to nut locks and is particularly adapted to railroad construction work.

One object of this invention is to provide means operating in conjunction with an ordinary bolt and nut to lock the latter in adjusted position, and prevent accidental displacement thereof.

Another and further object of this invention is the provision of a washer plate having means which will permit an exceptionally fine adjustment of the nut.

With these and other objects in view, my invention consists of certain novel details of construction, arrangement, and combination of parts more particularly set forth in the accompanying drawings, in which similar reference numerals indicate corresponding parts.

Figure 1, is a perspective view of a portion of a rail, showing my improved nut-lock applied thereto; Fig. 2, is a transverse vertical section taken on the line 2—2 of Fig. 4; Fig. 3 is a front elevation, showing a fragment of a rail, and illustrating the nut in one adjusted position. Fig. 4, is a similar view illustrating the nut in a further adjusted position. Fig. 5 is a similar view illustrating a still further adjustment of the nut; Fig. 6 is a perspective view of my improved washer plate.

Referring more particularly to the drawings, 1 indicates a section of a rail, 2 and 2' the fish plates disposed contiguous thereto. Passing through the fish plates 2 and 2', and the web of rail 1, is a bolt 3, having head 4 and threaded end 5 as clearly shown in Figs. 1 and 2. This bolt is of the ordinary construction and nothing novel is claimed in connection with the same. Disposed upon the bolt 3, is a substantial rectangular plate 6 formed of metal or other suitable washer material. This plate 6, when in place is disposed against one of the fish plates 2 or 2' with its lower edge abutting the base flange of the rail 1, so as to prevent rotary movement on the part of said plate or washer 6. Formed substantially in the center of said washer is an annular opening 7 to permit said plate to be readily disposed upon the bolt, and removed therefrom, when desired. Extending outwardly from the opening 7 are the two equi-spaced parallel slots 8 and 8'. These slots form as clearly shown in Figs. 3 to 6 of the drawings, a tongue 9 whose outer edge is curved so as to conform to the curvature of the bolt.

After the plate 6 has been properly positioned, a nut of the usual construction is screwed upon the threaded end 5 of bolt 3, as tightly as possible. Now, in order to permanently lock the nut in adjusted position, a key 10 which is simply an ordinary nail, has its pointed end placed in either of the slots 8 or 8' dependent on the position of the upper corners of the nut with respect to said slots, and then by hammering or otherwise is forced therethrough, until the lower pronged portion of the nail passes through the slot and beneath the nut 11. After the key has been hammered home, it will assume the configuration shown in Fig. 2 with the shoulder formed by so positioning the key, disposed in the path of one corner of the nut whereupon rotary movement on the part of the latter is prevented and the nut securely locked in adjusted position.

In regard to the slots 8 and 8', it will be noted that they are disposed in parallel relationship, the advantage residing in such disposition being due to the fact that it greatly increases the number of adjustments obtainable upon a complete revolution of the nut. Ordinarily it is a difficult matter to provide a nut lock that will permit the nut to be adjusted to its limit upon a bolt before locking, but however, by arranging the slots in parallel relation eight adjustments of the nut may be obtained upon completely revolving the same. Consequently it permits the nut to be adjusted upon the bolt as if a nut lock were not employed, after which it may be locked in adjusted position. Furthermore, inasmuch as the lower extremities of the slots 8 and 8' open into bolt openings 7 upon hammering the key 10 into its proper locking position, the pronged point of the said key will bite into the bolt and assist in maintaining the lock in a permanent fixed position, that is it will tend to prevent rotary movement on the part of said bolt.

In addition to the advantages above enumerated, obtained by arranging the slots 8 and 8' in parallel relationship it will also be apparent that such an arrangement permits of what might be termed a micrometer adjustment for the nut, inasmuch as it permits of an adjustment when the latter has apparently been adjusted to its limit, that is, if after adjusting the nut upon the bolt until it is apparently impossible to revolve it any further, it is found that one corner of the nut partly overlies one of the slots, then placing the key in this slot and hammering the same home, will tend to further revolve the nut as will be apparent without further description, thus giving an adjustment even after the nut has been adjusted upon the bolt to what seemed to be its maximum adjustment. Another very important feature of my improved nut lock resides in the fact that it may be used in connection with an ordinary bolt and nut, the only and additional element being the washer plate, and as these may be turned out by the thousands, it will readily be seen what a simple and easily constructed nut lock is provided by this invention.

From the foregoing it will be seen that I have provided a device which is extremely simple, efficient, and positive in its operation and inexpensive to construct.

Although I have in the foregoing specification set forth certain elements as past adopted to bring the functions ascribed to use, it will be understood that various minor changes in form, material and use may be made within the scope of the appended claim without departing from or sacrificing any of the principles of this invention.

Having now described my invention, what I claim is:

In a nut lock of the character specified, the combination with a support including a laterally projecting member, of a threaded bolt extending through said support, a nut engaged with said bolt, a rectangular shaped washer plate disposed upon said bolt and having the lower edge thereof engaging said laterally projecting member whereby to prevent rotary movement of said plate, the latter having a centrally arranged opening therein provided with two spaced, longitudinally extending slots communicating with and projecting from said opening toward one end of said plate and a pronged key engaging one of said slots, the pronged lower portion thereof engaging with said bolt and the upper portion projecting laterally from the plane of said plate to engage one corner of said nut whereby to lock the latter in adjusted position, said slots being arranged in parallel relation whereby an adjustment may be obtained for every eighth turn of the nut.

In testimony whereof I have hereunto set my hand in presence of two subscribing witnesses.

PHILIP A. LOGAN.

Witnesses:
 WILLIAM E. DARLING,
 NATALIE P. REED.

Copies of this patent may be obtained for five cents each, by addressing the "Commissioner of Patents. Washington, D. C."